US012574263B2

(12) United States Patent
Song et al.

(10) Patent No.: US 12,574,263 B2
(45) Date of Patent: Mar. 10, 2026

(54) TWO-TIER TOKEN METHOD AND SYSTEM FOR AN ASSET-BASED CONSENSUS

(71) Applicant: Concourse Petroleum Inc., Vancouver (CA)

(72) Inventors: Heiju Song, Vancouver (CA); Peng Jiang, Port Coquitlam (CA); Shougen Song, Vancouver (CA)

(73) Assignee: Concourse Petroleum Inc., Vancouver (CA)

( * ) Notice: Subject to any disclaimer, the term of this patent is extended or adjusted under 35 U.S.C. 154(b) by 144 days.

(21) Appl. No.: 18/681,118

(22) PCT Filed: Apr. 14, 2023

(86) PCT No.: PCT/IB2023/053850
§ 371 (c)(1),
(2) Date: Feb. 5, 2024

(87) PCT Pub. No.: WO2023/199286
PCT Pub. Date: Oct. 19, 2023

(65) Prior Publication Data
US 2024/0283667 A1      Aug. 22, 2024

Related U.S. Application Data

(60) Provisional application No. 63/330,996, filed on Apr. 14, 2022.

(51) Int. Cl.
| | |
|---|---|
| *H04L 29/06* | (2006.01) |
| *H04L 9/00* | (2022.01) |
| *H04L 9/32* | (2006.01) |

(52) U.S. Cl.
CPC .............. *H04L 9/50* (2022.05); *H04L 9/3213* (2013.01)

(58) Field of Classification Search
CPC .. G06F 21/62; G06F 21/6209; G06F 21/6218; G06F 21/6227; G06F 21/64;
(Continued)

(56) References Cited

U.S. PATENT DOCUMENTS

| | | | | |
|---|---|---|---|---|
| 11,164,107 B1* | 11/2021 | Craib | ...................... | G06N 20/00 |
| 2020/0184431 A1* | 6/2020 | Sinmao | ................ | G06Q 20/223 |

(Continued)

*Primary Examiner* — Malcolm Cribbs
(74) *Attorney, Agent, or Firm* — Harter Secrest & Emery LLP; Timothy W. Menasco, Esq.

(57) ABSTRACT

There is provided a method and a system implementing a two-tier blockchain ledger. The blockchain system includes a plurality of connected validator computer nodes maintaining the two-tier blockchain ledger, and a producer node connected to the system and being associated with a physical asset producing entity. The two-tier blockchain ledger includes a first-tier token, which is minted based on physical asset production data from the producer, and a second-tier token, the second-tier token quantity in the ledger depending on a total quantity of first-tier tokens. The producer node may receive newly generated first-tier tokens upon minting. Active validator nodes selected from the validator nodes based on staking of second-tier tokens and/or bidding of first-tier tokens form a consensus to validate blocks in the two-tier blockchain ledger. The active validator nodes may obtain newly generated second-tier tokens based on the total quantity of first-tier tokens.

26 Claims, 9 Drawing Sheets

300

(58) Field of Classification Search
CPC .... G06F 16/1824; G06F 21/44; G06F 21/629;
G06F 16/2379; G06F 16/9027; H04L
9/0643; H04L 9/30; H04L 2209/38; H04L
9/0637; H04L 9/0618; H04L 9/3247;
H04L 9/3239; H04L 9/3263; H04L
2209/56; H04L 9/0656; H04L 9/50; H04L
9/3213; G06Q 20/06; G06Q 20/382;
G06Q 20/401; G06Q 2220/00; G06Q
20/381; G06Q 40/04; G06Q 20/3825;
G06Q 20/3827; G06K 9/00577; G06K
2009/00583
See application file for complete search history.

(56) References Cited

U.S. PATENT DOCUMENTS

| | | | | |
|---|---|---|---|---|
| 2021/0150626 A1* | 5/2021 | Robotham | .......... | H04L 63/0442 |
| 2023/0073883 A1* | 3/2023 | Tierney | ............. | G06Q 20/3827 |
| 2023/0316272 A1* | 10/2023 | Zhang | .................... | G06Q 20/02 |
| | | | | 705/75 |
| 2023/0401570 A1* | 12/2023 | Rao | .................... | G06Q 20/1235 |

* cited by examiner

100 record quantity of assets
101 estimate value of assets
103 mint first-tier tokens based on asset
105 award first-tier tokens
107 determine second-tier token block rewards per period
109 select active validators
111 award second-tier token block rewards to active validators
113

300

400

500

600 selecting an asset producing entity
602 receiving asset production data
604 receiving trusted production data
606 comparing the asset production data with the trusted
production data
608 determining first-tier token reward
610 transmitting first-tier token reward
612

700

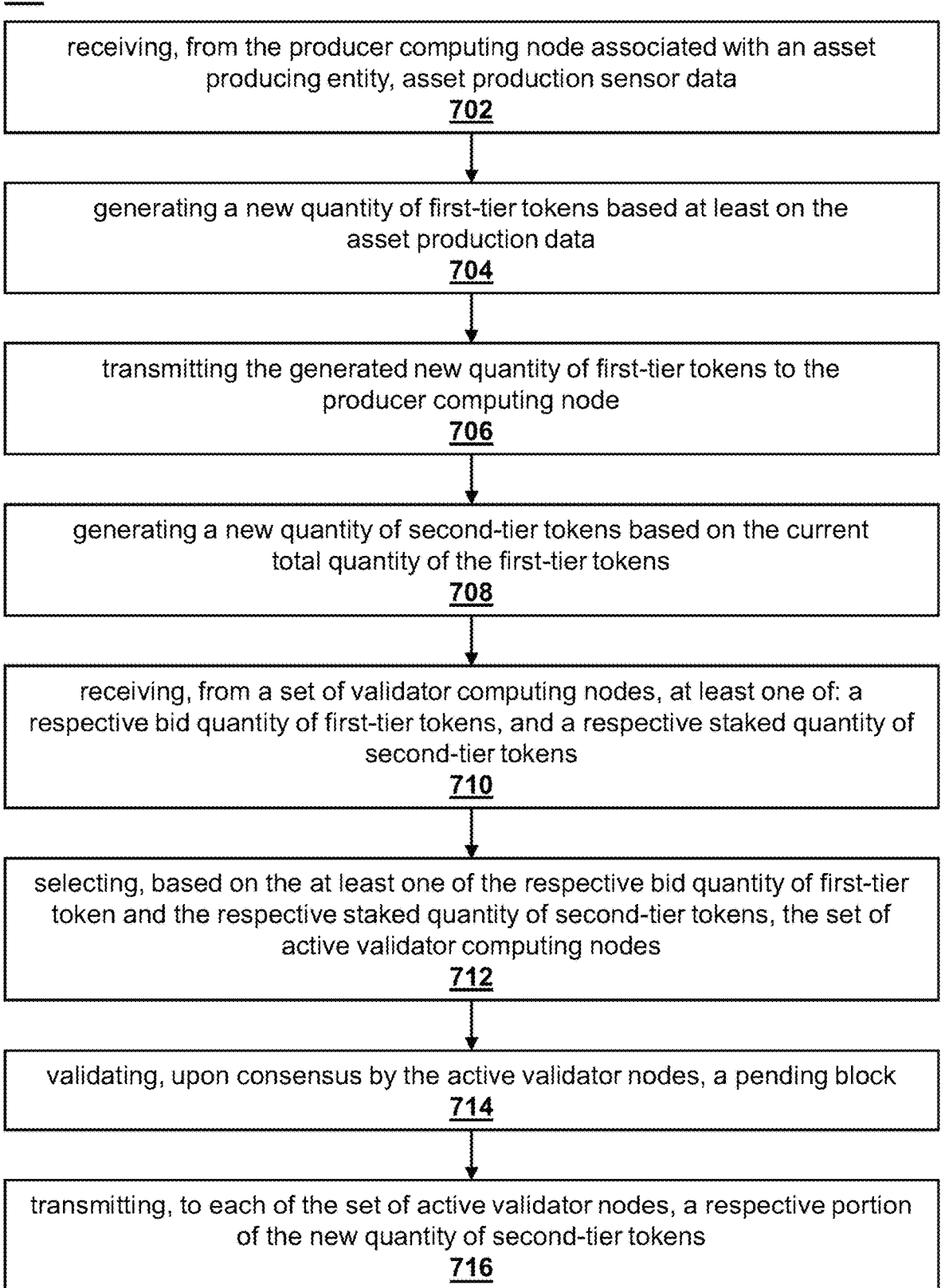

receiving, from the producer computing node associated with an asset
producing entity, asset production sensor data
702 generating a new quantity of first-tier tokens based at least on the
asset production data
704 transmitting the generated new quantity of first-tier tokens to the
producer computing node
706 generating a new quantity of second-tier tokens based on the current
total quantity of the first-tier tokens
708 receiving, from a set of validator computing nodes, at least one of: a
respective bid quantity of first-tier tokens, and a respective staked quantity of
second-tier tokens
710 selecting, based on the at least one of the respective bid quantity of first-tier
token and the respective staked quantity of second-tier tokens, the set of
active validator computing nodes
712 validating, upon consensus by the active validator nodes, a pending block
714 transmitting, to each of the set of active validator nodes, a respective portion
of the new quantity of second-tier tokens
716

FIG. 7

TWO-TIER TOKEN METHOD AND SYSTEM FOR AN ASSET-BASED CONSENSUS

CROSS-REFERENCE TO RELATED APPLICATIONS

The present application claim priority to U.S. Provisional Patent Application Ser. No. 63/330,996 filed on Apr. 14, 2022.

TECHNICAL FIELD

The present disclosure relates to methods and systems for an asset-based consensus blockchain system.

BACKGROUND

Conventionally, asset-backed tokens are minted based on some claims to off-chain assets. Asset-backed tokens are subject to regulations that limit their tradability, and are subject to a risk that bad actors may freely mint tokens.

Real-life assets and tokens often trigger securities law regulations. If a token represents a claim to assets, this may limit how freely and easily the token may be traded, which can add complexity to trading activity and be a source of frustration to traders. These tokens are often named Security Tokens.

Regulated securities markets, like stock markets, offer investors many products. Regulated service providers innovate constantly to provide new products to as many users as possible. Regulation of these markets is considered to be an important tool for protecting investors.

Even when Security Tokens are legally minted, such tokens often rely on external trust to maintain the correct link to an underlying off-chain asset. For example, Gold-backed tokens rely on off-chain audits of the stored gold in a vault. Fiat currency-backed tokens rely on off-chain audits of the financial status of the holder.

Risk mitigation has been tried through clever structuring of the underlying assets and through the threat of legal action for bad actors. However, enforcement after the fact is often an insufficient remedy. Hence, risk prevention is an important consideration when tokens are backed by real assets.

Blockchain technology emerged as a solution to some these challenges by providing a decentralized, transparent, and secure platform for storing, managing, and exchanging digital information.

One of the defining characteristics of blockchain-based assets is that they are not backed by physical assets like gold or traditional fiat currencies. Instead, these digital assets derive their value from various factors, including their scarcity, utility, and the consensus of their users. The lack of physical asset backing presents both unique opportunities and challenges in the development and implementation of blockchain technologies.

The absence of physical backing can offer advantages, such as increased flexibility and reduced dependency on centralized institutions, which can lead to faster transaction processing and lower fees. Furthermore, the intangible nature of blockchain-based assets allows for seamless integration into digital ecosystems, such as e-commerce platforms, decentralized finance (DeFi) applications, and digital identity systems.

However, the lack of physical backing can also give rise to certain challenges and limitations. For example, the value of blockchain-based assets can be more volatile than traditional assets, making them susceptible to market fluctuations and speculation. Additionally, the absence of a tangible basis can lead to skepticism and resistance from certain user segments, regulators, and traditional financial institutions.

Despite the challenges associated with the intangible nature of blockchain-based assets, there is significant potential for innovation in the development and implementation of blockchain technologies.

Given the aforementioned drawbacks that are present within current asset-based tokens, there is a potential for innovation in the development and implementation of blockchain technologies.

SUMMARY OF THE INVENTION

It is an object of the present disclosure to ameliorate one or more drawbacks of the prior art.

It is an object of the present disclosure to provide a two-tier token system with freely tradeable tokens, in which the supply of tokens is based on physical produced assets.

It is an object of the present disclosure to provide a secure and reliable consensus process for asset-based tokens.

Developer(s) of the present technology have appreciated that generally, asset backed tokens are minted based on some claims to off-chain assets. Such asset backed tokens trigger regulations that limit their tradability and expose the traditional tokens to the risk that malevolent entities may freely mint tokens.

Traditional proof of work based blockchain system are generally used to validate the integrity of information by solving cryptographic puzzles to prevent double-spending and to verify transactions. As the size of the blockchain grows, more computational resources are required to solve the cryptographic puzzles, leading to increased electricity consumption. This increased consumption has a negative impact on the environment.

The two-tier blockchain system provided by one or more embodiments of the present technology is based on proof of work (PoW) components and proof of stake (PoS) components that operate in synergy. The proof of work-based component is used to record asset production information and other value generating activities, and provides a measure of productivity of the participating actors. The proof of stake component is used to generate first-tier tokens based on the output of the proof of work component, determine second-tier tokens rewards, stake second-tier tokens, and validate block transactions to reward second-tier tokens to active validators. The proof of stake component enables validating the integrity of information, where validator nodes may receive second-tier tokens in response to staking second-tier tokens, and may also receive bonus second-tier tokens in response to bidding first-tier tokens. The second-tier tokens constitute the protocol tokens of the two-tier blockchain and are linked to the number of first-tier tokens in the two-tier blockchain.

In accordance with a broad aspect of the present technology, there is provided a method for transmitting second-tier tokens to a set of activate validator nodes in a blockchain system, the blockchain system comprising: a plurality of validator computer nodes connected over a communication network, the blockchain system maintaining a two-tier blockchain ledger comprising: a first-tier token, the first-tier token being a first type of token being associated with physical asset production, and a second-tier token, the second-tier token being a second type of token, a total quantity of the second-tier tokens depending on a total quantity of the first-tier tokens, the blockchain system being connected to a producer computer node, the method comprising: receiving, from the producer computer node associated with an asset producing entity, asset production sensor data representative of a production of a given physical asset, the asset production sensor data having been measured by sensors of the asset producing entity, generating a new quantity of first-tier tokens based at least on the asset production data, transmitting the generated new quantity of first-tier tokens to the producer computer node, a current total quantity of first-tier tokens being based on the generated new quantity of first-tier tokens and the total quantity of first-tier tokens, generating a new quantity of second-tier tokens based on: the current total quantity of the first-tier tokens, receiving, from a set of validator computer nodes from the plurality of validator computer nodes, at least one of: a respective bid quantity of first-tier tokens, and a respective staked quantity of second-tier tokens, selecting, based on the at least one of the respective bid quantity of first-tier token and the respective staked quantity of second-tier tokens, the set of active validator computer nodes from the set of validator computer nodes, validating, upon consensus by the active validator nodes, a pending block to obtain a new block in the two-tier blockchain ledger, the new block comprising at least an indication of the generated quantity of first-tier tokens and an indication of the total quantity of second-tier tokens, and transmitting, to each of the set of active validator nodes, a respective portion of the generated new quantity of second-tier tokens, a current total quantity of the second-tier tokens in the two-tier blockchain being based on the generated new quantity of the second-tier tokens.

In one or more embodiments of the method, the selecting, based on the at least one of the respective bid quantity of first-tier tokens and the respective staked quantity of second-tier tokens, the set of active validator computer nodes from the set of validator computer nodes comprises: selecting, based on the respective bid quantity of first tier-tokens, a subset of the set of validator nodes as super validator nodes, the super validator nodes being a subset of the active validator nodes, and determining the respective portion of the generated new quantity of second-tier tokens for the super validator nodes, the respective portion for the super validator nodes being greater than the respective portion of the generated quantity of second-tier tokens for the remainder of the active validator nodes.

In one or more embodiments of the method, the method further comprises: burning the respective bid quantity of first-tier tokens, the burning causing a reduction of the current total quantity of first-tier tokens based on the respective bid quantity of first-tier tokens.

In one or more embodiments of the method, the method further comprises: transmitting the respective staked quantity of second-tier tokens back to the active validator nodes.

In one or more embodiments of the method, the generating the new quantity of second-tier tokens comprises: determining, upon consensus by the blockchain system, an asset production increase parameter, and determining the generated new quantity of second-tier tokens based on the asset production increase parameter and the total quantity of first-tier tokens.

In one or more embodiments of the method, the generating the new quantity of first-tier tokens to the producer computer node comprises: receiving asset production data having been generated based on the asset production sensor data, receiving, from a trusted data source connected to the blockchain system, trusted production data, comparing the trusted production data and the trusted production data to obtain a comparison result, and determining the new quantity of first-tier tokens based on the comparison result.

In one or more embodiments of the method, the method further comprises, prior to validating, upon consensus by the active validator nodes, the pending block comprising at least the indication of the generated quantity of first-tier tokens to obtain the new block in the two-tier blockchain ledger: generating, by a given node of the set of validator nodes, based on the asset production sensor data, the pending block for a current period.

In one or more embodiments of the method, the method further comprises: determining a respective portion of the new generated quantity of second-tier tokens for transmission to the given node.

In one or more embodiments of the method, the total quantity of the first tier-tokens is a total quantity of first-tier tokens for a previous period.

In one or more embodiments of the method, the method further comprises: receiving, from the producer node, a request for addition to the blockchain system as a new validator node, and adding, upon consensus by the validator nodes, the producer node to the blockchain system as a new validator node.

In one or more embodiments of the method, the set of active validator computer nodes are an improper subset of the set of validator computer nodes.

In one or more embodiments of the method: each validator computer node stores a respective wallet comprising: a respective set of cryptographic keys, a respective quantity of second-tier tokens and a respective quantity of first-tier tokens, the producer computer node stores a respective producer wallet comprising a respective set of producer cryptographic keys, the respective producer wallet for receiving the generated new quantity of first-tier tokens.

In one or more embodiments of the method, the given physical asset comprises at least one of: include precious metals, energy commodities, agricultural commodities, and industrial metals.

In accordance with a broad aspect of the present technology, there is provided a system for transmitting a respective portion of a new quantity of second-tier tokens to a set of activate validator computer nodes in a two-tier blockchain ledger, the two-tier blockchain ledger comprising: a first-tier token, the first-tier token being a first type of token being associated with physical asset production, and a second-tier token, the second-tier token being a second type of token, a total quantity of the second-tier tokens depending on a total quantity of the first-tier tokens.

The system comprising: a plurality of validator computer nodes connected over a communication network, the system being configured for: receiving, from a producer computer node connected to the system, the producer computer node being associated with an asset producing entity, asset production sensor data representative of a production of a given physical asset, the asset production sensor data having been measured by sensors of the asset producing entity, generating a new quantity of first-tier tokens based at least on the asset production data, transmitting the generated new quantity of first-tier tokens to the producer computer node, a current total quantity of first-tier tokens being based on the generated new quantity of first-tier tokens and the total quantity of first-tier tokens, generating a new quantity of second-tier tokens based on the current total quantity of the first-tier tokens, receiving, from a set of validator computer nodes from the plurality of validator computer nodes, at least one of: a respective bid quantity of first-tier tokens, and a respective staked quantity of second-tier tokens, selecting, based on the at least one of the respective bid quantity of first-tier token and the respective staked quantity of second-tier tokens, the set of active validator computer nodes from the set of validator computer nodes, validating, upon consensus by the active validator nodes, a pending block to obtain a new block in the two-tier blockchain ledger, the new block comprising at least an indication of the generated quantity of first-tier tokens and an indication of the total quantity of second-tier tokens, and transmitting, to each of the set of active validator nodes, a respective portion of the generated new quantity of second-tier tokens, a current total quantity of the second-tier tokens in the two-tier blockchain being based on the generated new quantity of the second-tier tokens.

In one or more embodiments of the system, the selecting, based on the at least one of the respective bid quantity of first-tier tokens and the respective staked quantity of second-tier tokens, the set of active validator computer nodes from the set of validator computer nodes comprises: selecting, based on the respective bid quantity of first tier-tokens, a subset of the set of validator nodes as super validator nodes, the super validator nodes being a subset of the active validator nodes, and determining the respective portion of the generated new quantity of second-tier tokens for the super validator nodes, the respective portion for the super validator nodes being greater than the respective portion of the generated quantity of second-tier tokens for the remainder of the active validator nodes.

In one or more embodiments of the system, the system is further configured for: burning the respective bid quantity of first-tier tokens, the burning causing a reduction of the current total quantity of first-tier tokens based on the respective bid quantity of first-tier tokens.

In one or more embodiments of the system, the system is further configured for: transmitting the respective staked quantity of second-tier tokens back to the active validator nodes.

In one or more embodiments of the system, the generating the new quantity of second-tier tokens comprises: determining, upon consensus by the blockchain system, an asset production increase parameter, and determining the generated new quantity of second-tier tokens based on the asset production increase parameter and the total quantity of first-tier tokens.

In one or more embodiments of the system, the generating the new quantity of first-tier tokens to the producer computer node comprises: receiving asset production data having been generated based on the asset production sensor data, receiving, from a trusted data source connected to the blockchain system, trusted production data, comparing the trusted production data and the trusted production data to obtain a comparison result, and determining the new quantity of first-tier tokens based on the comparison result.

In one or more embodiments of the system, the system is further configured for, prior to validating, upon consensus by the active validator nodes, the pending block comprising at least the indication of the generated quantity of first-tier tokens to obtain the new block in the two-tier blockchain ledger: generating, by a given node of the set of validator nodes, based on the asset production sensor data, the pending block for a current period.

In one or more embodiments of the system, the system is further configured for: determining a respective portion of the new generated quantity of second-tier tokens for transmission to the given node.

In one or more embodiments of the system, the total quantity of the first tier-tokens is a total quantity of first-tier tokens for a previous period.

In one or more embodiments of the system, the system is further configured for: receiving, from the producer node, a request for addition to the blockchain system as a new validator node, and adding, upon consensus by the validator nodes, the producer node to the blockchain system as a new validator node.

In one or more embodiments of the system, the set of active validator computer nodes are an improper subset of the set of validator computer nodes.

In one or more embodiments of the system, each validator computer node stores a respective wallet comprising: a respective set of cryptographic keys, a respective quantity of second-tier tokens and a respective quantity of first-tier tokens, the producer computer node stores a respective producer wallet comprising a respective set of producer cryptographic keys, the respective producer wallet for receiving the generated new quantity of first-tier tokens.

In one or more embodiments of the system, the given physical asset comprises at least one of: include precious metals, energy commodities, agricultural commodities, and industrial metals.

In one or more embodiments, the first-tier tokens are further associated with digital asset production. The digital assets may be produced by the asset producing entity and/or other entities, and first-tier tokens may be generated upon validation of the digital assets.

In the context of the present specification, a "server" or a "node" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus, information includes, but is not limited to, audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the servers, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

Further features and advantages of the present technology will become apparent from the following detailed description, taken in combination with the appended drawings, in which:

FIG. 7 illustrates a flowchart of a method for transmitting a portion of a newly generated quantity of second-tier tokens to active validator nodes in accordance with one or more non-limiting embodiments of the present technology.

DETAILED DESCRIPTION

Figure 1:
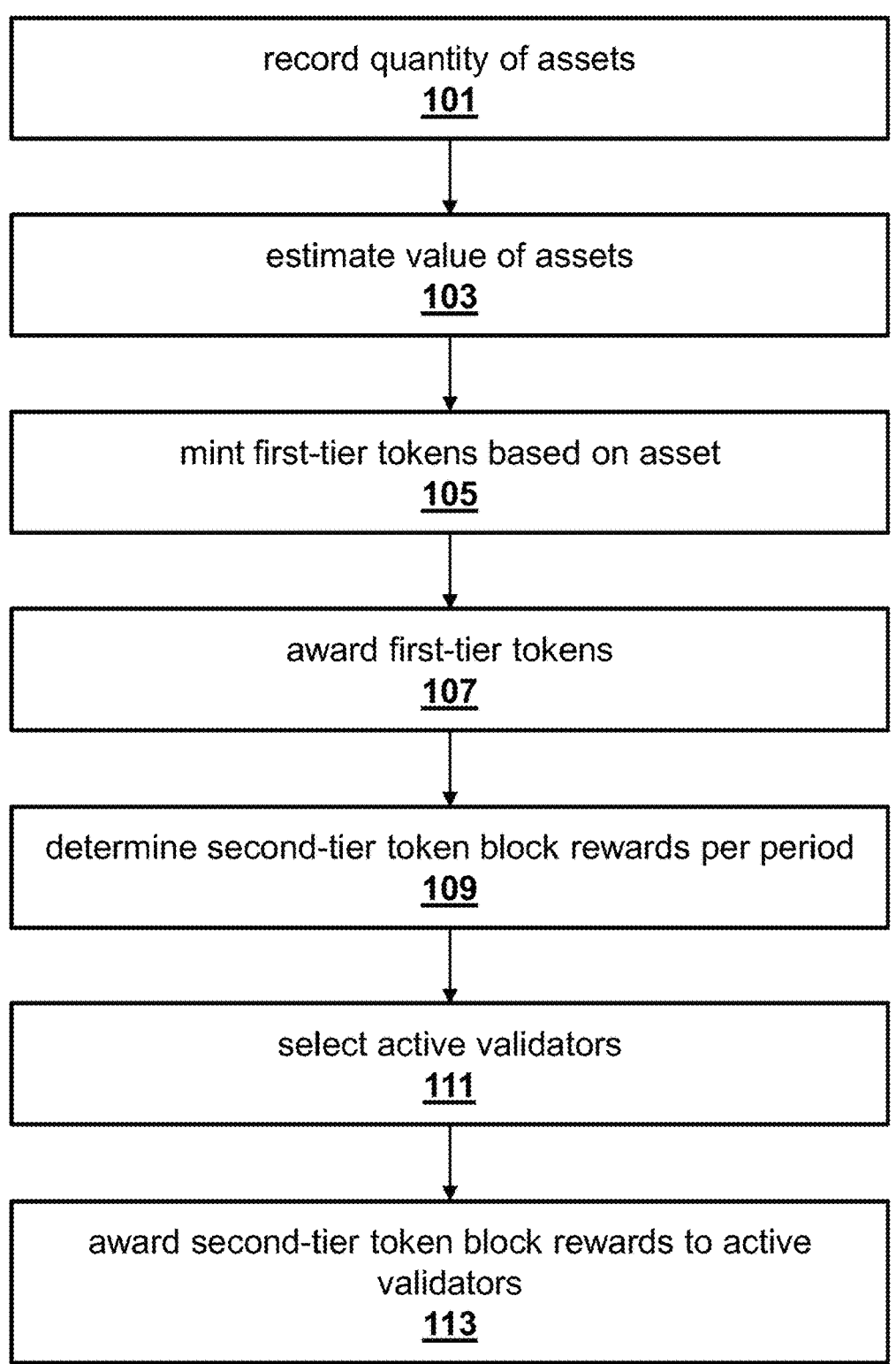
FIG. 1 illustrates a flow chart of general method of awarding second-tier token rewards to active validator in accordance with one or more non-limiting embodiments of the present technology

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments and/or implementations described herein. However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

It should be noted that methods and systems of the embodiments of the disclosure and data described above are not, in any sense, abstract or intangible. Instead, the data is necessarily presented in a digital form and stored in a physical data-storage computer-readable medium, such as an electronic memory, mass-storage device, or other physical, tangible, data-storage device and medium. It should also be noted that the currently described data-processing and data-storage methods cannot be carried out manually by a human analyst, because of the complexity and vast numbers of intermediate results generated for processing and analysis of even quite modest numbers of data. Instead, the methods described herein are necessarily carried out by electronic computing systems having processors on electronically or magnetically stored data, with the results of the data processing and data analysis digitally stored in one or more tangible, physical, data-storage devices and media. The methods and systems of the present disclosure have tangible and practical advantages, providing more expedient and more reliable processing of vast numbers of data. More specifically, one or more embodiments of the present technology provide an incentive-based system for asset producing entities to participate in the blockchain system while also preserving the anonymity of such asset producing entities, as well as providing verifiability of the produced assets via a distributed ledger by a decentralized network of computer nodes. This eliminates the need for a central authority, reducing the risk of single points of failure and potential attacks on data. Additionally, the present methods and system provide an immutable record of asset productivity, ownership and transaction history, where each transaction is recorded in a block, which is cryptographically linked to the previous block, forming a tamper-resistant chain. This creates a permanent and traceable record of asset productivity and ownership, without compromising the anonymity of the users.

Computer nodes participating in the distributed ledger are incentivized to produce physical goods, as opposed to "classic" blockchain or ledger-based systems, where no incentive and tie to real-world produced assets exist.

Embodiments of the present technology aim to reduce the reliance of the blockchain system on graphical processing units (GPUs) or application-specific integrated circuit (ASIC) computing rigs, which use high numbers of electricity, as the present technology enables to generate protocol tokens based on physically produced assets.

The present technology is adapted and configured to utilize a two-tier token system in the consensus process. The present technology uses a first type of token ("first-tier token") which are directly linked to physically produced assets (and optionally digitally produced assets) submitted to the blockchain system, and a second type of token ("second-tier token") which are used as protocol tokens for performing transactions.

A node verifies transactions in order to gain new second-tier token rewards (i.e., a respective quantity of second-tier tokens). New second-tier token rewards correspond to newly generated second-tier tokens that are added to the current total quantity of second-tier token in the blockchain ledger. The second-tier token rewards are determined based on the total quantity of first-tier tokens, which have been generated based on the quantity of physically produced assets (and optionally digitally produced asset).

Since first-tier tokens are linked to and/or awarded based on produced assets, embodiments of the present technology incentivize production of assets having tangible utility and intrinsic value. Asset producing entities (i.e., off-chain entities) which do not have second-tier tokens and which have been previously approved by participating nodes in the two-tier blockchain system (i.e., on-chain entities or validator nodes) can, upon consensus, be awarded with first-tier tokens. Second-tier tokens are awarded to a subset of the validator nodes based on the quantity of first-tier tokens that have been generated based on the produced assets.

A two-tier token system allows off-chain assets to drive the creation of second-tier tokens which are protocol tokens, so that the core consensus process can be conducted in a manner that is insulated from bad actors and additional regulation. Off-chain assets include physical assets produced by asset producing entities The two-tier token system allows entities associated with off-chain assets to be awarded a first-tier token commensurate with the quantity of the associated produced assets. The first-tier tokens constitute fungible digital records of assets. In alternative embodiments, other type of tokens, such as NFT tokens, may also be used as first-tier tokens.

Environment and Blockchain System

Figure 8:
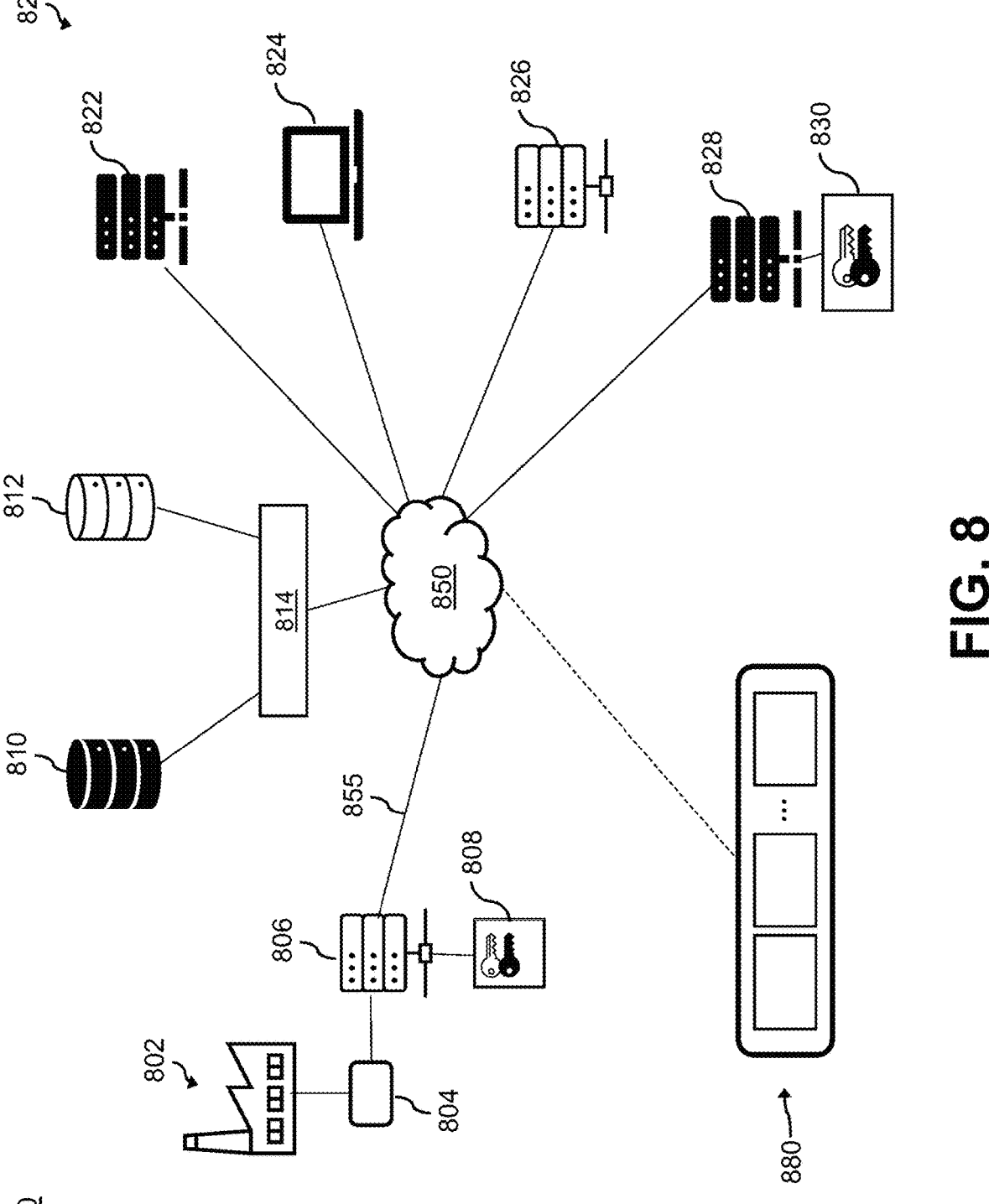
FIG. 8 illustrates a schematic diagram of an environment and two-tier blockchain system in accordance with one or more non-limiting embodiments of the present technology.

With reference to FIG. 8, there is illustrated an environment and blockchain system 800 in accordance with one or more non-limiting embodiments of the present technology.

The environment and blockchain system 800 comprises inter alia an asset producing entity 802 associated with a producer node 806, a third-party data source 810, a trusted data source 812, and a plurality of computer nodes 822, 824, 826, 828

The producer computer node 806, the third-party data source 810, the trusted data source 812, and the plurality of computer nodes 822, 824, 826, 828 are connected over a communication network 850 via respective communication links 855 (only one numbered).

It should be noted that FIG. 8 depicts only one asset producing entity 802, one producer computer node 806, one third party data source 810 and one trusted data source 812, the singular or the plural may be used interchangeably, and the environment and blockchain system 800 may include a plurality of asset producing entities 802, producer computer nodes 806, third-party data sources 810 and trusted data sources 812

The plurality of computer nodes 822, 824, 826, 828 form a two-tier blockchain system 820. For a given period, the producer node 806 may not be part of the two-tier blockchain system 820, however a producer node 806 may become a node in the two-tier blockchain system 820 at a later period.

Two-Tier Blockchain System

The two-tier blockchain system 820 comprises the plurality of computer nodes 822, 824, 826, 828. The plurality of computer nodes 822, 824, 826, 828 may comprise, for a given period, validator nodes and active validator nodes (not numbered).

The two-tier blockchain system 820 maintains a two-tier blockchain ledger 880 comprising a plurality of blocks.

The two-tier blockchain ledger 880 comprises first-tier tokens and second-tier tokens, as will be explained below. The second-tier tokens are the protocol tokens of the two-tier blockchain ledger 880, i.e., the primary tokens of the two-tier blockchain ledger 880.

Validator nodes are responsible for committing (i.e., proposing) new blocks to the two-tier blockchain ledger 880 through voting. Validator nodes may also perform transactions of second-tier tokens with other validator nodes. Validator nodes are computer nodes having second-tier tokens and optionally, first-tier tokens.

Active validator nodes are a subset of the validator nodes which are selected among the validator nodes for a current period, as will be explained below. In one or more embodiments, active validator nodes may be all validator nodes (i.e., improper subset of the validator nodes). In one or more other embodiments, active validator nodes may be selected among the validator nodes (i.e., proper subset of the validator nodes).

In one or more embodiments, validator nodes may include a subset of super validator nodes, which are validator nodes having bid first-tier tokens, which increases their probability of being selected as active validator nodes, as will be explained below. A producer node 806 may become a validator node at subsequent periods.

It will be appreciated that the role of the nodes and the number of nodes in the two-tier blockchain system 820 may vary in time, and the following is only provided as a non-limiting example.

Computer Node

The plurality of computer nodes 822, 824, 826, 828 work together to maintain a tamper-evident and secure digital ledger in the form of the two-tier blockchain ledger 880.

Figure 9:
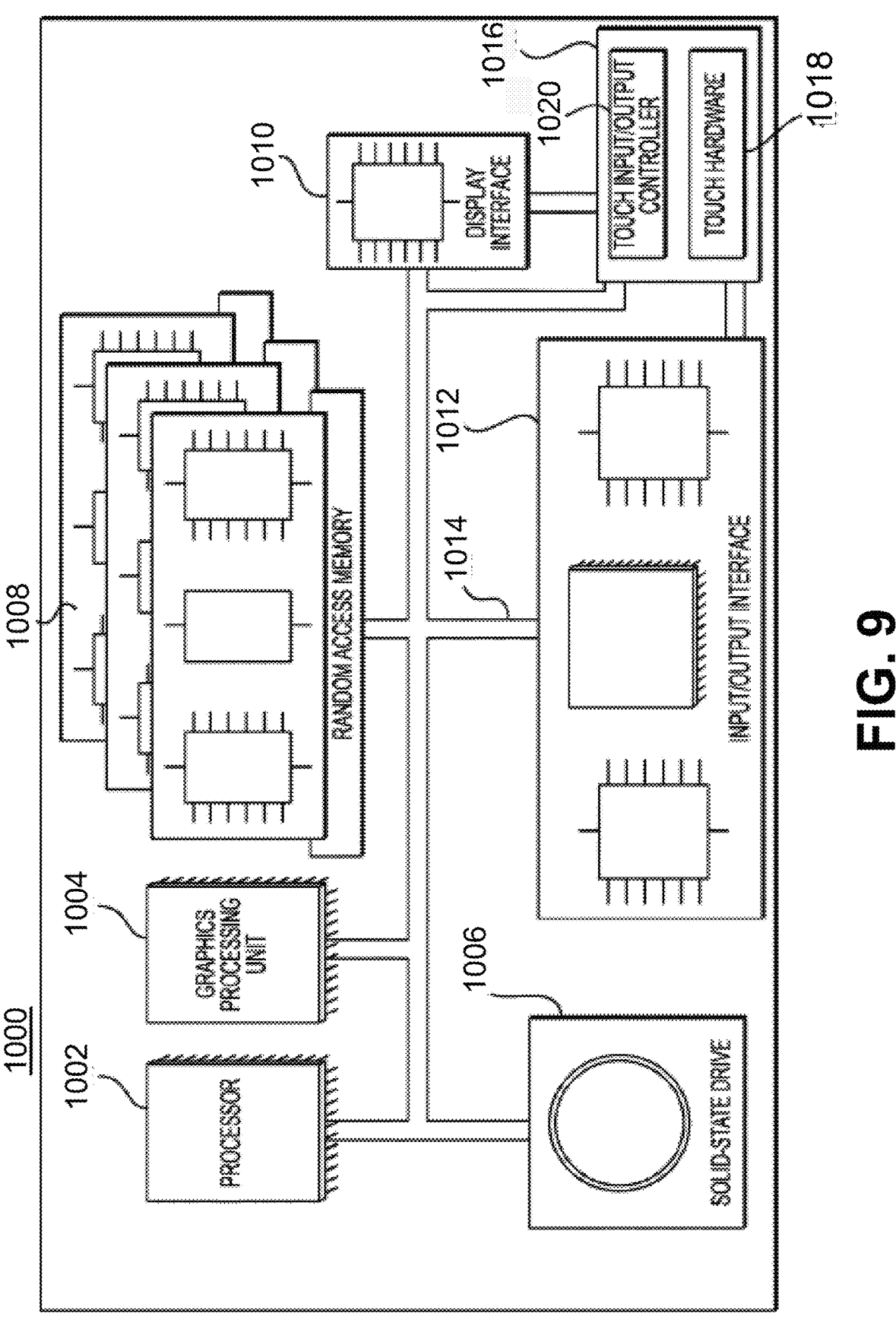
FIG. 9 illustrates a schematic diagram of an electronic device in accordance with one or more non-limiting embodiments of the present technology.

In the context of the present technology, each computer node 822, 824, 826, 828 of the plurality of computer nodes 822, 824, 826, 828 may be implemented as a different type of computing device. A non-limiting example of a computing device is illustrated in FIG. 9 and will be described below.

Each computer node 822, 824, 826, 828 may be associated with a respective entity and/or user (not illustrated).

Each computer node 822, 824, 826, 828 is associated with a respective digital wallet 830, which will be referred to as respective wallet 830 (only one depicted for computer node 822, 824, 826, 828).

The respective wallet 830 typically comprises a public key and a private key pair (not numbered). The public key is used to receive funds from other users, while the private key is used to sign and authorize transactions from the wallet. The private key is kept secure and is known only to the owner of the wallet, while the public key can be shared publicly to receive funds.

In one or more embodiments, the respective wallet 830 may further comprise signature capability, which requires multiple signatures from different parties to authorize a transaction. The respective wallet may have built-in smart contract functionality, which enables the creation and execution of complex programmable transactions.

A smart contract is a self-executing computer program that operates on the blockchain system 820 and automatically enforces the terms of a contract between parties without the need for intermediaries. It is encoded as a set of instructions that is stored on storage mediums of the components of the blockchain system 820 and executed by the respective processors of the computer nodes 822, 824, 826, 828.

For a given computer node 822, 824, 826, 828, the respective wallet 830 may comprise a respective quantity of first-tier tokens and a respective quantity of second-tier tokens.

In one or more embodiments, each computer node 822, 824, 826, 828 has a respective quantity of second-tier tokens in its respective wallet 830.

In one or more other embodiments, to be in possession of second-tier tokens, the computer node 822, 824, 826, 828 has a respective quantity of first-tier tokens in its respective wallet 830. First-tier tokens are linked to physical assets produced within the environment and blockchain system 800, as will be explained below.

Asset Producing Entities

The asset producing entities 802 (only one illustrated) comprise physical asset producing entities and optionally digital asset producing entities (not separately numbered). Each asset producing entity 802 is associated with a respective producer computer node 806.

A given asset producing entity 802 produces one or more respective produced assets. Each respective produced asset is associated with a respective asset information. In one or more embodiments, the respective asset information for a given asset producing entity 802 includes type, quantity, location, quality, condition, ownership, and production capacity.

Non-limiting examples of physical assets produced by the asset producing entities 802 may include precious metals (e.g., gold, silver, platinum, and palladium), energy commodities (e.g., crude oil, natural gas, and coal), agricultural commodities (e.g., wheat, corn, soybeans, and cotton), and industrial metals (e.g., copper, aluminum, zinc, and nickel).

In one or more embodiments, each asset producing entity 802 may have been previously registered and approved by the two-tier blockchain system 820. In one or more embodiments, the asset producing entity 802 producing physical assets has undergone Know-Your-Customer (KYC) and Anti-money Laundering (AML) procedures. Physical assets licenses are checked. It will be appreciated that the registration and approval may be optional.

Each asset producing entity 802 has sensors 804 configured to measure, determine, store, and transmit asset production data to the respective producer node 806. It will be appreciated that the sensors 804 are hardware and may include computing and software components.

The sensors 804 may, as a non-limiting example, measure data before, during and after the production of the physical assets, such as weight, volume, as well as any other type of physical parameter (e.g., temperature, pH, electroconductivity, pressure, etc.) for raw or unprocessed materials, intermediates and intermediate processes, and final products.

In some embodiments of the present technology, a given asset producing entity 802 may also produce digital assets, such as cryptocurrencies, digital tokens, digital securities, digital art and digital music.

Producer Node

Each producer computer node 806, which may also be referred to as producer node 806, is associated with an asset producing entity 802 is connected to the sensors 804 to receive asset production information and executes data management systems (not illustrated), which are compatible with the two-tier blockchain system 820 and have been previously approved by the two-tier blockchain system 820.

Each producer node 806 is configured to inter alia: (i) receive asset production sensor data; (ii) transmit the asset production sensor data to be added to a pending block; and (ii) receive first-tier block rewards upon validation of the block.

Each producer node 806 has a respective wallet 808 storing one or more respective cryptographic keys, similar to the respective wallet 830 of the plurality of computer nodes 822, 824, 826, 828.

Each producer node 806 has a respective quantity of first-tier tokens associated with the two-tier blockchain ledger 880. A producer node 806 does not generally possess second-tier tokens.

To obtain second-tier tokens, the produced node 806 must operate as a validator node in the blockchain system 820. To operate as a validator node, the producer node 806 must execute required software and have computational resources (i.e., processing and/or memory) above a threshold required for validator nodes. The blockchain system 820 may add the producer node 806 as a validator node upon consensus. The threshold computational resources may be dynamically determined based on available computational resources in the blockchain system 820 and estimated computational resources requirements of the blockchain system 820.

Third Party Data Source

The third-party data source 810 is configured to inter alia: (i) receive requests for information; and (ii) transmit the information in response to the requests. In one or more embodiments, the trusted data source 812 may transmit asset information in a synchronous or asynchronous manner.

As such, a given third-party data source 810 may be implemented as a computing device, a database, a non-transitory storage medium and the like In one or more embodiments, the third-party data source 810 may transmit external information relating to physical assets and digital assets.

Non-limiting examples of third-party data sources 810 include websites, blogs, and devices associated with entities such as companies and users.

Trusted Data Source

The trusted data source 812 has been previously approved by the two-tier blockchain system 820. In one or more embodiments, the trusted data source 812 may be a former third-party data source have been voted and approved by the two-tier blockchain system 820.

The trusted data source 812 are configured to inter alia: (i) receive requests for asset information; and (ii) transmit the asset information in response to the requests. In one or more embodiments, the trusted data source 812 may transmit asset information in a synchronous or asynchronous manner.

As such, a given trusted data source 812 may be implemented as a computing device, a database, a non-transitory storage medium and the like. Non-limiting examples of trusted data sources 812 include public stock exchange, regulated financial institutions, government regulators, market data providers and other blockchain data providers.

In one or more embodiments, the environment and blockchain system 800 comprises a feeder 814, which may be implemented as hardware and software (or a combination thereof) and may be connected to the two-tier blockchain system 820. The feeder 814 is configured to retrieve and transmit data from the third-party data source 810 and/or trusted data sources 812 to the two-tier blockchain system 820.

Communication Network

In some embodiments of the present technology, the communications network 850 is the Internet. In alternative non-limiting embodiments, the communication network 850 can be implemented as any suitable local area network (LAN), wide area network (WAN), a private communication network or the like. It should be expressly understood that implementations for the communication network 850 are for illustration purposes only. How a communication link 855 (not separately numbered) between the sensors 804, the producer node 806, the third-party data source 810, the trusted data source 812, and the plurality of computer nodes 822, 824, 826, 828 and the communications network 850 is implemented will depend inter alia on how each of the producer node 806, the third-party data source 810, the trusted data source 812, and the plurality of computer nodes 822, 824, 826, 828 is implemented.

The communication network 850 may be used in order to transmit data packets amongst the sensors 804, producer node 806, the third-party data source 810, the trusted data source 812, and the plurality of computer nodes 822, 824, 826, 828.

FIG. 1 illustrates a general operation of the asset-based token for the consensus process, in accordance with an embodiment. FIG. 1 may be executed within the environment and two-tier blockchain system 800 of FIG. 8.

At step 101, a quantity of produced assets is recorded. The produced assets can be a physical asset or commodity, such as, gold or oil, that is produced by asset producers (i.e., asset producing entities 802); a digital asset such as bitcoin, Ethereum or other cryptocurrency; or any other resource produced or owned by off-chain users. In some embodiments, assets that are in the entities' possession but were not produced by the entities may be recorded, for example if the assets were produced by a subsidiary or related party of the entities, or if they were acquired by some other means. Depending on the type of asset, the quality of the asset might also be recorded. For example, different types of oil might have a different market value.

In one or more embodiments, a quantity of assets is produced by the asset producing entity 802 and measured by sensors 804 connected to a producer node 806, which may transmit asset production sensor data to the producer node 806 (FIG. 8).

At step 103, the market value of the physical assets is estimated. In one embodiment, unit market price of the off-chain assets is recorded by price feeds from financial data service providers and the market value of the physical asset is estimated based on the unit price and the quantity of asset produced.

In one or more embodiments, the price feeds may be from the third-party data source 810 and/or the trusted data sources 812. The information relating to the unit value of the produced asset may be determined by the feeder 814 based on information from the third-party data source 810 and/or the trusted data sources 812.

Embodiments of the present disclosure provide for the two-tier blockchain system 820 to mint first-tier tokens based on inter alia the market value of the recorded physical assets. In such embodiments, the blockchain system 820 uses a first-tier token as a record of physical asset production activity. Additionally, the first-tier tokens may also record digital asset production by asset producing entities 802.

At step 105, first-tier tokens are minted based on the estimated value of the recorded physical assets. Minting is the process of generating new first-tier tokens by authenticating data and recording the information onto the blockchain ledger 880 through a proof of stake protocol.

At step 107, the first-tier tokens are awarded to asset producers proportionally to their produced assets. More specifically, respective quantities of first-tier tokens are awarded to the respective wallets 808 of the producer nodes 806 based on at least the produced asset sensor data from the sensors 804 connected to the asset producing entity 802.

In operation, the two-tier blockchain system 820 can form a new block at regular intervals, for example every 1 second. If the block contains transactions, hence a non-empty block, second-tier token rewards are distributed to all active validators who validate the block. The selection and role of active validators will be described below.

Steps 105 and 107 will be described in more detail in the first-tier token minting procedure 600 of FIG. 6.

The determination of the second-tier token block rewards is performed at step 109. More specifically, the quantity of second-tier tokens to be distributed to active validator nodes having participated in validating a pending block is determined. In accordance with one or more embodiments, the second-tier block reward may be set to an initial value and after each period a new value may be determined. In each period, the blockchain system 820 will decrease block rewards, which is scaled by the respective quantity of first-tier tokens that has been generated for the previous period. A period can be set to 30 million blocks, which is approximately one year. Alternatively, a different period duration can be set.

In the following, an example procedure for determining the second-tier block reward (i.e., respective quantity of newly generated second-tier tokens by the blockchain system 820) that will be transmitted to active validator nodes will be described.

The second-tier token block reward for a current period is determined based on the second-tier block reward for the previous period, the first-tier token reward for the previous period, the first-tier token reward before the previous period, and an asset production increase parameter.

The initial block reward can be set to n0=5 second-tier tokens per block.

Period 1 block reward n1 and Period 2 block reward n2 are set to equal no.

Subsequently, the reward for period x is referred to as n(x):

$$n(x) = n(x-1) * f(\text{delta});$$

where n(x) is the current second-tier token block reward (i.e., quantity of newly generated second-tier tokens to be added to the previous total quantity of second-tier tokens in the blockchain ledger 880);

where n(x−1) is the second-tier token block reward for the previous period;

where delta=((first-tier tokens from period x−1)/(first-tier tokens from period x−2))/((1+Goal));

Goal is an asset production increase parameter corresponding to a targeted percentage increase in first-tier token production, set by vote from validator nodes; by default, Goal=10%.

f(delta) has 2 states: normal and abnormal.

Normal state:

When 0<delta<1, f(delta)=0.75+[0.9−0.75] *delta;

Essentially, f(delta) will float between [0.75−0.9]; thus, second-tier block rewards will decrease by factor of [0.75−0.9].

Abnormal state:

When delta=0, f(delta)=0.5;

Where second-tier token block reward will be halved if no first-tier tokens are produced;

When delta>=1, f(delta)=min(0.99, 0.01*Math.floor (delta−1)+0.9);

f(delta) will float between [0.9−0.99];

block reward will be reduced only by [0.9−0.99] if first-tier token production is higher than Goal and capped at 0.99 even if production is much higher than Goal.

It should be understood that this determination is only one example, and any suitable definition of n(x) can be used instead. In particular, the initial value n0 and the decrease f(delta) can be any suitable quantities or functions.

Figure 2:
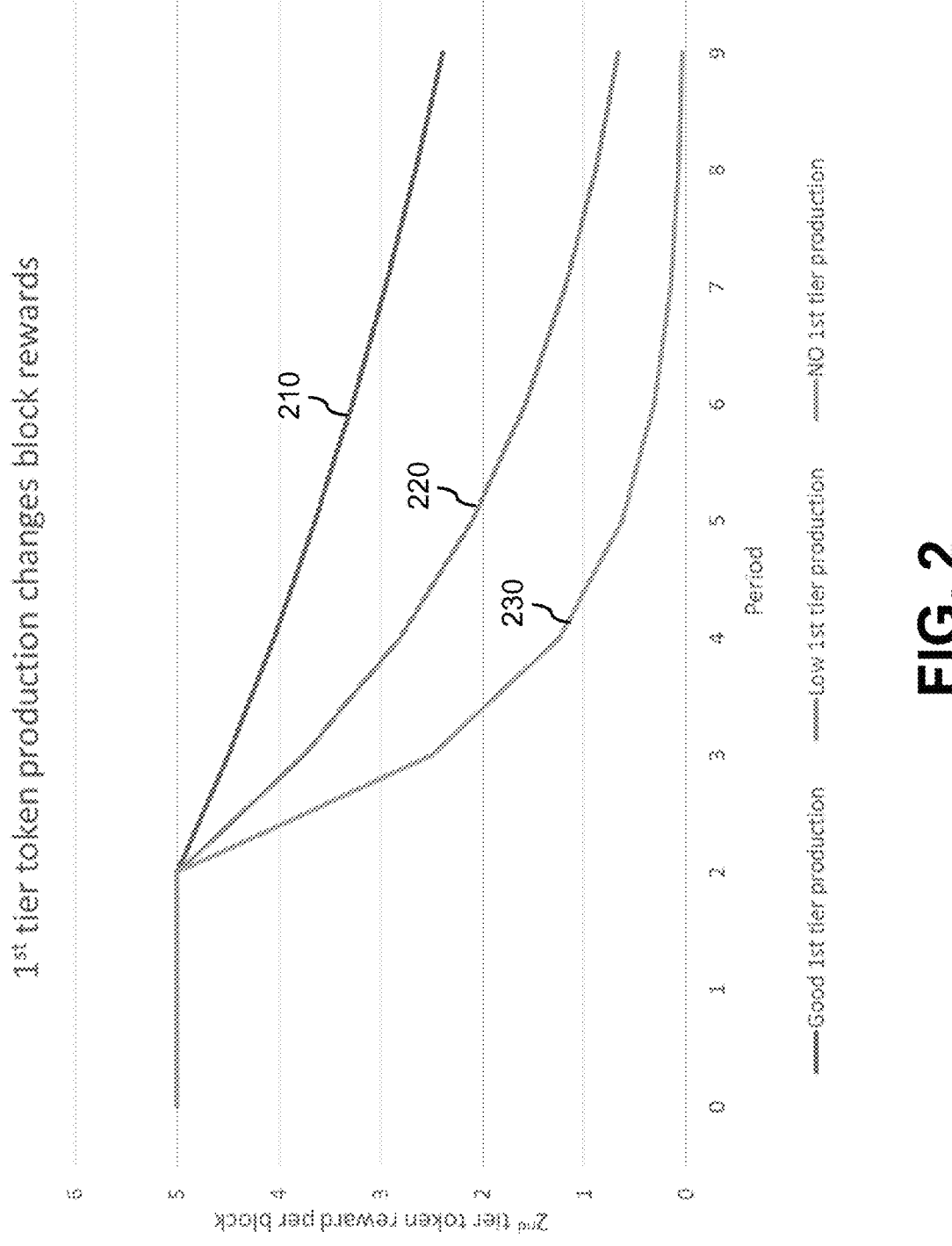
FIG. 2 illustrates a non-limiting example of a chart showing how second-tier block rewards vary in function of the level of first-tier tokens produced in the previous period.

FIG. 2 illustrates a non-limiting example of a chart 200 showing how second-tier block rewards n(x) per block may vary based on the quantity of first-tier tokens produced in the previous period. The chart 200 comprises three block reward functions, a first block reward function 210, a second block reward function 220, and a third block reward function 230.

According to the illustrated non-limiting example, the block reward is initially set to 5 second-tier tokens per block, and the second-tier block rewards decreases automatically per period based on the number of first-tier tokens produced, where one period corresponds to one year. As can be seen with the first block reward function 210 corresponding to a "good" first-tier token production, the second block reward function 220 corresponding to a "low" first-tier token production, and the third block reward function 230 corresponding to no first-tier token production, if fewer first-tier tokens are produced, the second-tier token reward per block is reduced with each period. In the illustrated example, more first-tier tokens minted results in the second-tier block reward decreasing more slowly over time. Thus, a higher asset production generates more first-tier tokens, which will allow a higher total of second-tier tokens to be minted, and less asset production will allow a lower total of second-tier tokens to be minted.

The second-tier block reward is reduced periodically according to a range, e.g., 10% to 50%. The second-tier block reward creates a supply ceiling for second-tier tokens, which have a finite total number that is determined based on the economic production.

Returning to FIG. 1, at step 111, active validators are selected from among all the validator nodes bidding to gain the status of active validator. The selection of active validators will be described with reference to FIG. 3, FIG. 4 and FIG. 5. In alternative embodiments, no selection may be performed and every node in the two-tier blockchain system 820 may participate as an active validator node.

At step 113, second-tier block rewards are awarded to the active validators having been selected via a bidding and staking procedure. Entities that operate validator nodes may bid and/or stake to participate in the bidding and staking process as active validator nodes. All entities may "follow" active validator nodes and share the rewards by staking second-tier tokens to any node. Staking allows for permissionless participation in the protocol consensus. Any validator node may stake second-tier tokens to any node to share second-tier block rewards.

Staking refers to the process of depositing a quantity of second-tier tokens as collateral to become eligible to validate transactions as an active validator node and create new blocks on the blockchain ledger 880. Second-tier tokens that are staked may be returned to the active validator nodes. It will be appreciated that staking involves the use of cryptographic algorithms and consensus mechanisms to ensure that the blockchain system 820 is secure and operating in a fair and transparent manner. Staking involves the use of cryptographic protocols known in the art and requires sufficient computational resources to perform effectively.

Bidding refers to the process of expending a quantity of first-tier tokens as collateral to become eligible to validate transactions as an active validator node and create new blocks on the blockchain ledger 880. First-tier tokens that are bid are not returned to the active validator nodes, and are removed from the blockchain ledger 880, which is a process referred to as "burning". Burning reduces the total quantity of first-tier tokens in the blockchain ledger 880. Bidding involves the use of sophisticated algorithms and cryptographic protocols known in the art to ensure that the transactions are secure and transparent.

In One or More Embodiments, the Staking Procedure May be Executed as Follows:

Select a validator node, and stake second-tier tokens to it. After staking, the staker nodes must manually un-stake tokens. Any staked second-tier tokens will continue to accumulate second-tier rewards until being un-staked.

The second-tier block reward distribution function, in one or more embodiments, is determined using the following scheme:

Total block reward S=block reward n(x)+total gas fees gas

S is split into the following parts:

C: Public token pool, used by vote of validator nodes, which in one example is 1%*S.

A and B: 2 parts of the proposer bonus, rewarded to the proposer of a new block. The proposer is a validator node that proposes a pending block which will become a new block upon validation. In one example: A=1%*S; and B=at most 4%*S, depending on the proportion of digital signatures obtained from all active validators.

T: First-tier Validator bonus rewarded to super validators in the active validator node list. T is divided among super active validator nodes based on proportion of first-tier tokens bid, such that more first-tier tokens bid gives more rewards. In one example, T=15%*(number of super active validators)/(number of active validators)*S R: Base Rewards, rewarded to each active validator and its stakers. R=S−C−A−B−T is the remaining portion of S.

R is split between all active validator nodes. The split helps to prevent monopolistic events. Each active validator node further splits R equally to all stakers, after withholding a small predetermined fee, which may be, as a non-limiting example, 1% for node owners. In one or more alternative embodiments, the split may be an even split.

Figure 3:
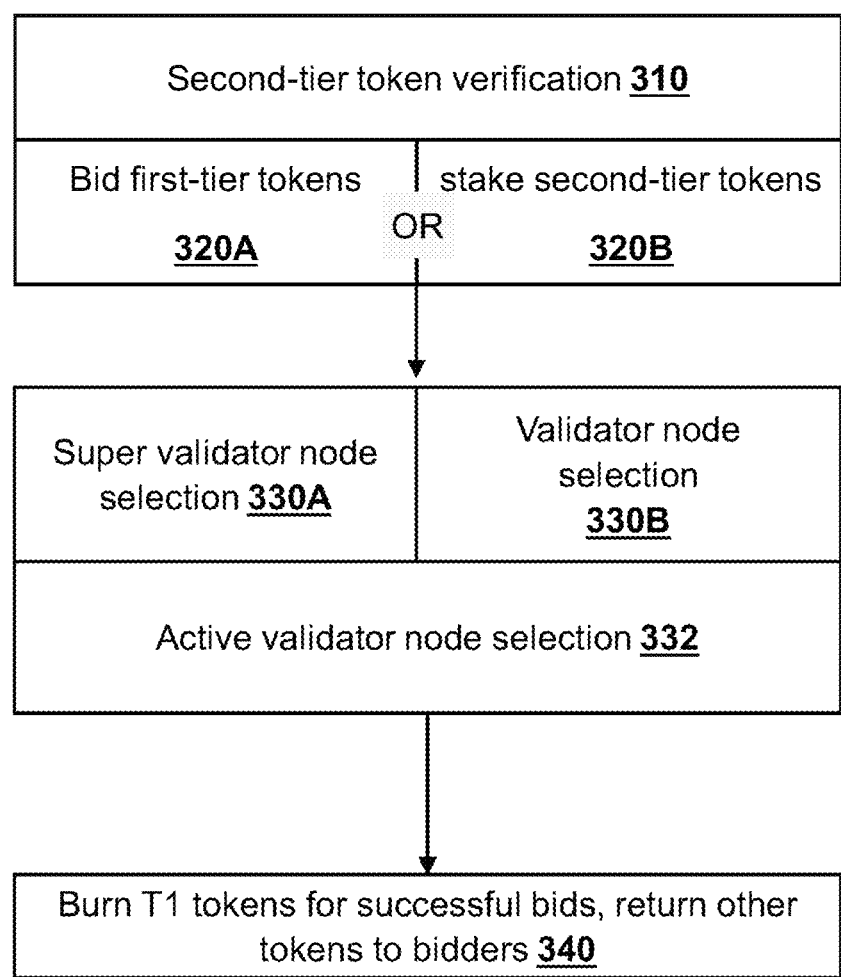
FIG. 3 illustrates a first active validator node selection procedure in accordance with one or more non-limiting embodiments of the present technology.
Figure 4:
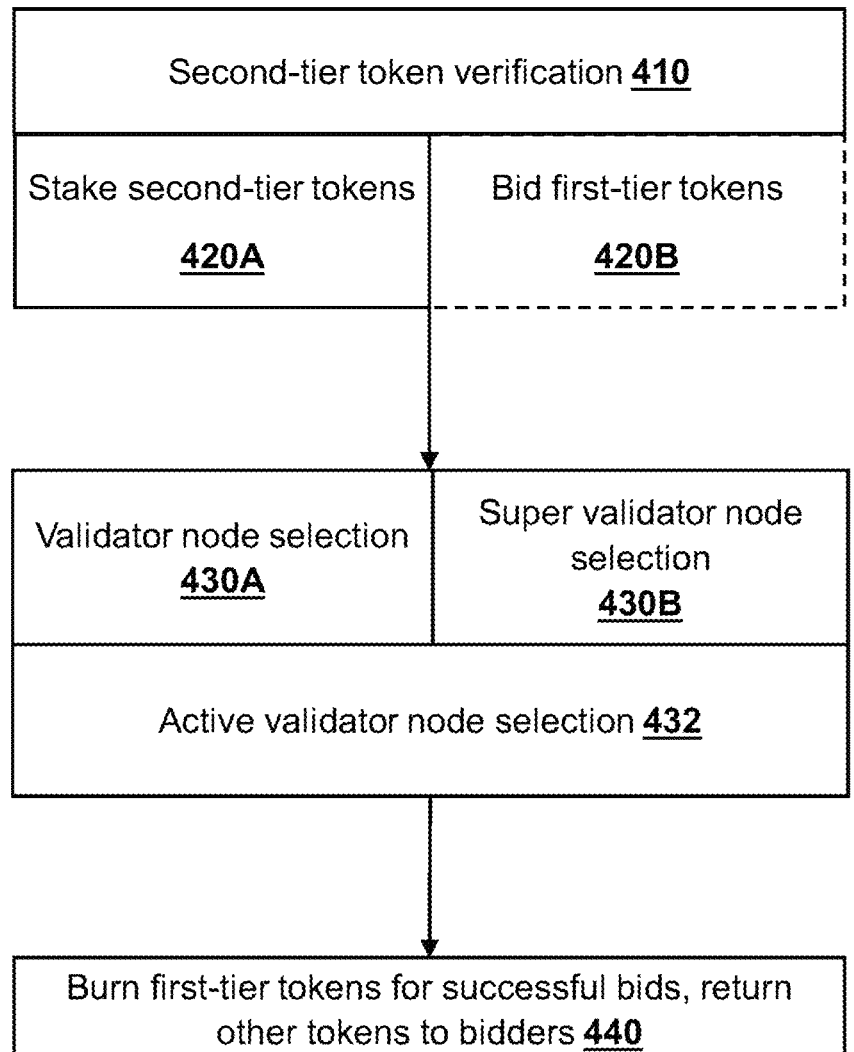
FIG. 4 illustrates a second active validator node selection procedure in accordance with one or more non-limiting embodiments of the present technology.
Figure 5:
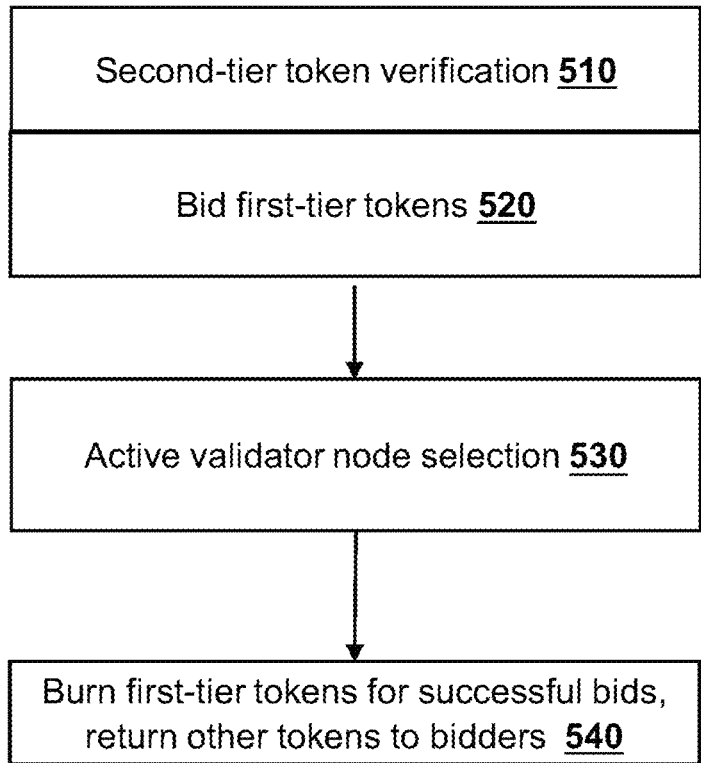
FIG. 5 illustrates a third active validator node selection procedure in accordance with one or more non-limiting embodiments of the present technology.

FIG. 3, FIG. 4 and FIG. 5 provide different embodiments of active validator node selection procedures.

First Active Validator Node Selection Procedure

FIG. 3 illustrates a first active validator node selection procedure 300 in accordance with one or more embodiments of the present technology.

The purpose of the first active validator node selection procedure 300 is for the two-tier blockchain system 820 to select active validator nodes to participate in the proof of stake consensus process. The first active validator selection procedure 300 is executed by the two-tier blockchain system 820.

In the first active validator node selection procedure 300, validator nodes may bid first-tier tokens or stake second-tier tokens to be selected as active validators. Active validators that may receive second-tier token rewards upon consensus.

In some embodiments, a producer node may associate with other staker node(s) to form a validator node. Alternatively, the producer node may have its own set of stakers and may become, de facto, a validator node.

The first active validator node selection procedure 300 is executed within the two-tier blockchain system 820 at a given frequency. The frequency may be predetermined based on a duration of time and/or number of blocks, or may be dynamically determined based on a duration of time and/or number of blocks. As a non-limiting example, the active validator node selection procedure 300 may be executed every five minutes.

According to step 310, second-tier token verification is performed, where validator nodes are required to have second-tier tokens in order to be part of the set of candidate active validator nodes to obtain the active validator node status, i.e., to proceed at step 320A or step 320B.

In some embodiments, the validator nodes wishing to be part of the set of candidate active validator nodes to become an active validator may require having minimal computing resources.

In one embodiment, the validator node may purchase second-tier tokens from an exchange platform. Alternatively, validator nodes can purchase second-tier tokens directly from other validator nodes using a Peer-to-Peer (P2P) protocol. The validator nodes having second-tier tokens can then bid first-tier tokens or stake second-tier tokens to gain the status of an active validator node.

According to step 320, a given validator node can bid first-tier tokens (step 320A) or stake second-tier tokens (step 320B). It will be appreciated that the given validator node bidding first-tier tokens must have second-tier tokens in its respective wallet, but does not need to stake its second-tier tokens.

In one or more embodiments, each respective validator node wishing to participate in the bidding and staking procedure transmits an indication of its bid or stake to the two-tier blockchain system 820, upon which the two-tier blockchain system 820 verifies if the respective validator node has: (i) staked a respective number of second-tier tokens equal to or above a second-tier token stake threshold; or (ii) bid a respective number of first-tier tokens equal to above a first-tier token bid threshold.

According to step 330B, if the respective number of second-tier tokens is above the respective second-tier stake threshold, the respective validator node is added to the set of candidate active validator nodes If the respective number of second-tier tokens is below the second-tier bid threshold, the respective validator node is not added to the set of candidate active validator nodes.

According to step 330A, if the respective number of first-tier tokens is equal to or above a first-tier bid threshold, the respective validator node is added to the set of candidate active validator nodes and designated as a super validator node.

As a non-limiting example, the first-tier threshold (i.e., minimum) for a first-tier token bid may be 1 first-tier token, and the second-tier threshold for a second-tier token stake may be 158 second-tier tokens.

According to step 332, active validator node selection is performed. In one or more embodiments, validator nodes perform rounds of selection to form a set of active validator nodes from the set of candidate active validator nodes. In one or more embodiments, the number of round of selections may be predetermined by the blockchain system 820. As a non-limiting example, there may be 2 rounds of random selection.

In one non-limiting example, a first round of random selection may be performed to select up to 100 super validator nodes and 100 validator nodes from all validator nodes of the set of candidate active validator nodes. A second round of random selection is then performed to select up to 100 active validators from the nodes selected in round 1. It will be appreciated that any other suitable number of nodes can be selected in each round. It will be appreciated that super validator nodes have a higher chance of being selected as active validator nodes than remaining nodes in the set of candidate active validator nodes.

In one or more embodiments, the validator nodes may have an equal chance of being selected as active validator. Alternatively, other selection mechanisms can be used.

According to step 340, first-tier tokens used in successful bids by active validator nodes are burned. Second-tier tokens used in successful staking are returned to the active validator node. First-tier tokens and second-tier tokens used in unsuccessful bids (i.e., from validator nodes not having been selected as active validator nodes) are returned to validator nodes. As stated previously, burning is the process in which first-tier tokens are removed from circulation, which reduces the number of first-tier tokens in use. The first-tier tokens are transmitted from the respective wallets of the selected active validator nodes that are super validator nodes (i.e., having bid first-tier tokens) to wallet address that cannot be used for transactions other than receiving the first-tier tokens. Thus, the total quantity of first-tier tokens in the blockchain ledger 880 decreases.

Second Active Validator Node Selection Procedure

FIG. 4 illustrates a second active validator node selection procedure 400 in accordance with one or more embodiments of the present technology.

The second active validator node selection procedure 400 is similar to the first active validator node selection procedure 300, however validator nodes wishing to participate as active validators can only bid a respective quantity of first-tier tokens, which will be burned.

The purpose of the second active validator node selection procedure 400 is for the two-tier blockchain system 820 to select active validator nodes to participate in the proof of stake consensus process.

In the second active validator node selection procedure 400, validator nodes must stake second-tier tokens and may optionally bid first-tier tokens to be selected as active validators.

According to step 410, second-tier token verification is performed, where validator nodes are required to have second-tier tokens in order to be part of the set of candidate active validator nodes to obtain the active validator node status, i.e., to proceed at step 420A and step 420B.

After second-tier token verification of step 410, all validator nodes execute step 420A. Validator nodes may optionally execute step 420B.

According to step 420, a given validator node stakes second-tier tokens (step 420A). The given validator node may optionally bid first-tier tokens (step 420B). The indication of each stake and bid is transmitted to the blockchain system 820.

According to step 430A, if the respective number of second-tier tokens is above the respective second-tier token stake threshold, the respective validator node is added to the set of candidate active validator nodes.

If the respective number of second-tier tokens is below the second-tier bid threshold, the respective validator node is not added to the set of candidate active validator nodes.

According to 430B, if the respective number of second-tier tokens is above or equal to the respective second-tier token threshold and if the respective number of first-tier tokens is equal to above a first-tier token threshold, the respective validator node is added to the set of candidate active validator nodes and designated as a super validator node As a non-limiting example, the first-tier token threshold (i.e., minimum) for a first-tier token bid may be 1 first-tier token, and the second-tier token threshold for a second-tier token stake may be 158 second-tier tokens.

According to step 432, active validator node selection is performed. In one or more embodiments, validator nodes perform rounds of selection to form a set of active validator nodes from the set of candidate active validator nodes. In one or more embodiments, the number of rounds of selection may be predetermined by the blockchain system 820. As a non-limiting example, there may be 2 rounds of random selection.

In one non-limiting example, a first round of random selection may be performed to select up to 100 super validator nodes and 100 validator nodes from all validator nodes of the set of candidate active validator nodes. A second round of random selection is then performed to select up to 100 active validators from the nodes selected in round 1. It will be appreciated that any other suitable number of nodes can be selected in each round.

In one or more embodiments, the validator nodes may have an equal chance of being selected as active validator. Alternatively, other selection mechanisms can be used.

According to step 440, first-tier tokens used in successful bids by active validator nodes (i.e., super validator nodes) are burned. Second-tier tokens used in successful staking are returned to the active validator nodes. First-tier tokens and second-tier tokens used in unsuccessful bids (i.e., from candidate validator nodes not having been selected as active validator nodes) are returned to the validator nodes.

Third Active Validator Node Selection Procedure

FIG. 5 illustrates a third active validator node selection procedure 500 in accordance with one or more embodiments of the present technology.

The third active validator node selection procedure 500 is similar to the first active validator node selection procedure 300 and the second active validator node selection procedure 400, however validator nodes only bid a respective quantity of first-tier tokens, which will be burned.

According to step 510, second-tier token verification is performed, where validator nodes are required to have second-tier tokens in order to be part of the set of candidate active validator nodes to obtain the active validator node status, i.e., to proceed to step 520. In one or more embodiments, the two-tier token verification is performed by the two-tier blockchain system 820.

According to step 520, a given validator node bids a respective quantity of first-tier tokens. It will be appreciated that in this embodiment, validator node does not stake second-tier tokens, but requires second-tier tokens in its respective wallet to bid first-tier tokens.

In one or more embodiments, each respective validator node wishing to participate in the bidding process transmits an indication of its bid to the two-tier blockchain system 820, upon which the two-tier blockchain system 820 verifies if the respective validator node has bid a respective quantity of first-tier tokens equal to or above a first-tier bid threshold.

According to step 530, active validator node selection is performed. In one or more embodiments, the two-tier blockchain system 800 selects active validator nodes from the set of candidate active validator nodes having bid a respective number of first-tier tokens equal to or above a first-tier bid threshold. In one or more embodiments, all the set of candidate active validator nodes may be selected as active validator nodes.

According to step 540, first-tier tokens used in successful bids are burned. First-tier tokens in unsuccessful bids are returned to the validator nodes not having been selected as active validator nodes.

First-Tier Token Minting Procedure

Figure 6:
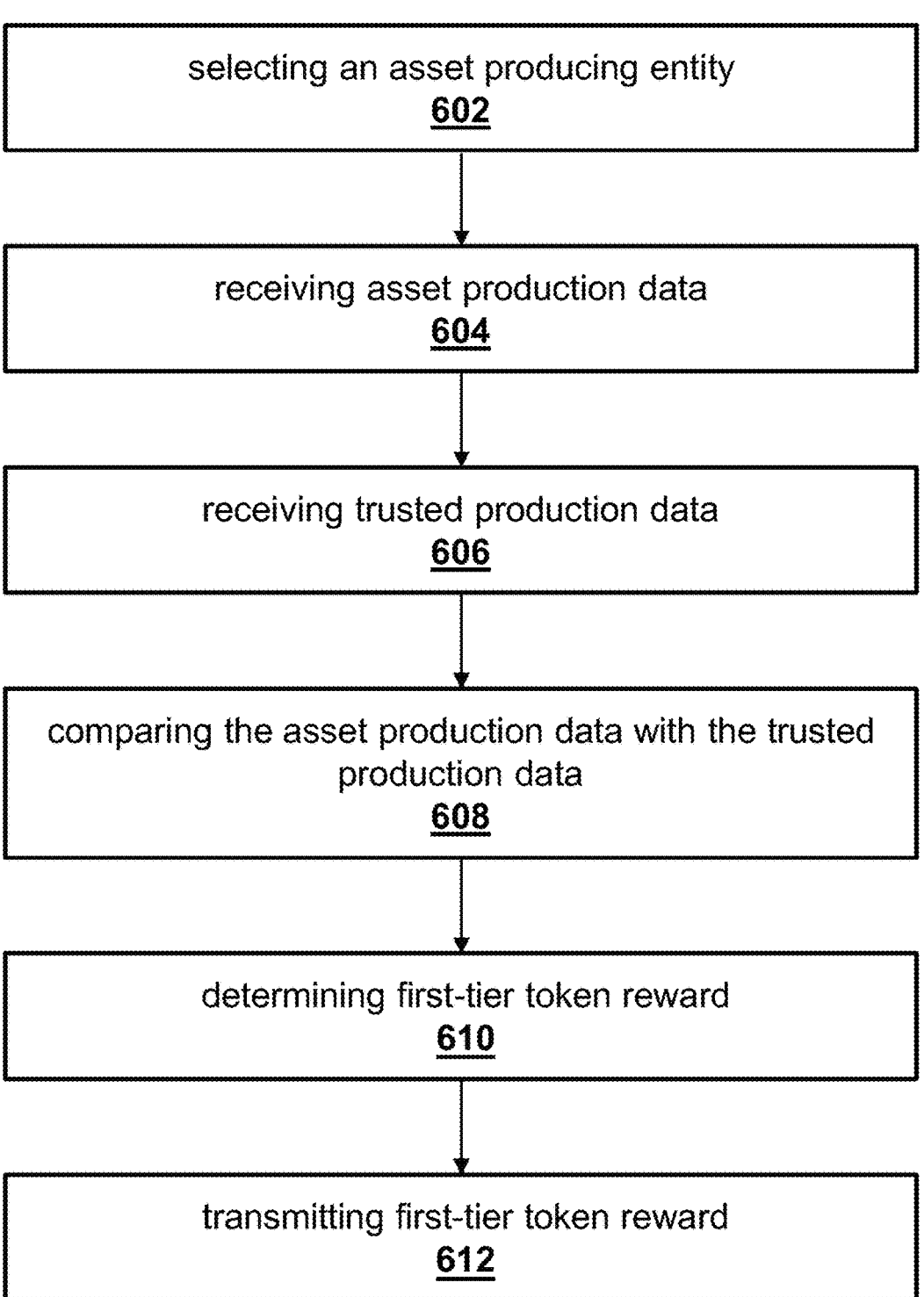
FIG. 6 illustrates a flowchart of a method for first-tier token minting in accordance with one or more non-limiting embodiments of the present technology.

FIG. 6 illustrates a first-tier token minting procedure 600 in accordance with an embodiment. In one or more embodiments, the first-tier token minting procedure 600 is executed within the environment and blockchain system 800 of FIG. 8.

The purpose of the first-tier token minting procedure 600 is to generate first-tier tokens in the blockchain ledger 880, which will impact the generation of second-tier tokens in the blockchain ledger 880 for subsequent periods.

According to step 602, a given asset producing entity is selected.

In one or more embodiments, the given asset producing entity 802 is selected from a plurality of asset producing entities by the two-tier blockchain system 820.

The given asset producing entity 802 may be in the process of, or may have produced a physical asset and measured asset production sensor data using sensors 804. The asset production sensor data measured by the sensors 804 may be transmitted to the producer node 806 associated with the asset producing entity 802.

The selection of the given asset producing entity includes identifying the producer node 806 that will receive first-tier token rewards. In one or more embodiments, the producer node 806 associated with the asset producing entity 802 is selected, and the respective producer node wallet 808 that will receive the reward of first-tier tokens is identified.

According to step 604, the two-tier blockchain system receives asset production data based on the quantity of assets produced. In one or more embodiments, the two-tier blockchain system 820 receives the asset production data which has been generated based on the asset production sensor data and the asset information from the third-party data source 810. The asset production data may be generated by the producer node 806. In other embodiments, the asset production data may be generated by the feeder 814 using data from the third-party data source 810 and the producer node 806.

According to step 606, the blockchain system 820 receives trusted production data from a trusted data source. In one or more embodiments, the trusted production data is received from the trusted production data source 812. It will be appreciated that the trusted production data may be determined based on trusted production data from a plurality of trusted production data sources 812, where the trusted production data is obtained by averaging or weighing the data from the plurality of trusted production data sources.

In one or more embodiments, the feeder 814 determines and transmits the trusted production data to the two-tier blockchain system 820.

According to step 608, the blockchain system 820 compares the production data and the trusted production data. It will be understood that comparing process is performed to assess the liability of the production data provided by the producer node 806 associated with the asset producing entity 802. In one or more embodiments, step 608 may be executed using a smart contract. In one embodiment, the producer node 806 may provide prepayment to the two-tier blockchain system 820.

Different techniques may be used to compare the production data and the trusted production data. It will be appreciated that respective asset information linked to the given asset of the producing entity 802 (e.g., type, quantity, location, quality, condition, ownership, and production capacity) may be used to compare the production data and the trusted production data.

In one or more embodiments, the two-tier blockchain system 820 obtains a comparison result. As a non-limiting example, the comparison result may be a difference between the asset production data and the trusted production data.

According to step 610, the two-tier blockchain system determines a first-tier token reward based on the comparison result. In one or more embodiments, the two-tier blockchain system 820 determines the first-tier token reward (i.e., quantity of first-tier tokens) by selecting a lowest value between the asset production data and the trusted production data, receiving the first-tier token reward function, determining a threshold value based on the comparison result, and calculating the first-tier token reward based on the lowest value, the threshold value and the first-tier token reward function. Thus, the producer node 806 may be penalized for reporting inaccurate asset production data.

The first-tier token reward increases the total quantity of first-tier tokens in the blockchain ledger 880.

In one or more embodiments, the information including the comparison result and information used to calculate the first-tier token reward may be added to the pending block in the two-tier blockchain ledger 880. It will be appreciated that at least a portion of the information may be encrypted and/or one-way encrypted in the pending block.

According to step 612, the two-tier blockchain system transmits the first-tier token rewards to the producer node. In one or more embodiments, the two-tier blockchain system 820 transmits the first-tier token reward to the producer node 806.

With reference to FIG. 7, there is shown a flowchart of a method 700 of transmitting a respective portion newly generated second-tier tokens to active validator nodes. The method 700 may be executed within the blockchain system 820.

According to processing step 702, the blockchain system 820 receives, from the producer computer node 806 associated with an asset producing entity 802, asset production sensor data representative of a production of a given physical asset, the asset production sensor data having been measured by sensors 804 of the asset producing entity 802.

According to processing step 704, the blockchain system 820 generates a new quantity of first-tier tokens based at least on the asset production data. The generation of a new quantity of first-tier token is also referred to as token minting.

In one or more embodiments, the new quantity of first-tier tokens corresponds to a first-tier token reward for a period. The quantity of first-tier tokens is generated based on a comparison of asset production data and trusted asset production data. The asset production data is determined based on data from a third-party data source 810 and the asset production sensor data and transmitted to the blockchain system 820. The trusted asset production data is determined based on the asset production sensor data and data from trusted data sources 812. The blockchain system 820 performs comparison of the asset production data and trusted asset production data, determines and generates the new quantity of first-tier tokens upon consensus.

According to processing step 706, the blockchain system 820 transmits the generated new quantity of first-tier tokens to the producer computer node 806. The current total quantity of first-tier tokens in the blockchain ledger 880 corresponds to the generated new quantity of first-tier tokens and the total quantity of first-tier tokens (i.e., total having been generated for all previous periods). The blockchain system 820 transmits the generated quantity of first-tier tokens to the producer node wallet 808 of the producer node 806.

According to processing step 708, the blockchain system 820 generates a new quantity of second-tier tokens based on: the current total quantity of the first-tier tokens.

The new quantity of second-tier tokens corresponds to a total quantity of second-tier token rewards that will be distributed to active validator nodes for the current period.

In one or more embodiments, the new quantity of second-tier tokens is determined based on the second-tier block reward for the previous period, the first-tier token reward for the previous period and the first-tier token reward before the previous period, and an asset production increase parameter.

According to processing step 710, the blockchain system 820 receives, from a set of validator computer nodes from the plurality of validator computer nodes, at least one of: a respective bid quantity of first-tier tokens, and a respective staked quantity of second-tier tokens. The set of validator computer nodes having bid first-tier tokens and/or staked second-tier tokens form a set of candidate active validator nodes.

According to processing step 712, the blockchain system 820 selects, based on the at least one of the respective bid quantity of first-tier token and the respective staked quantity of second-tier tokens, the set of active validator computer nodes from the set of validator computer nodes.

In one or more embodiments, the set of active validator computer nodes comprise super validator computer nodes.

According to processing step 714, the active validator nodes validate, upon consensus, a pending block to obtain a new block in the blockchain ledger 880. The pending block is proposed by a given validator node prior to processing step 714.

According to processing step 716, the blockchain system 820 transmits, to each of the set of active validator nodes, a respective portion of the new quantity of second-tier tokens, a current total quantity of the second-tier tokens in the two-tier blockchain ledger 880 being based on the generated new quantity of the second-tier tokens.

In one or more embodiments, prior to processing step 716, the blockchain system 820 determines the respective portion of the new quantity of second-tier tokens, which corresponds to a respective quantity of second-tier token rewards that are transmitted to each active validator node. The respective portion of the new quantity of second-tier tokens In one or more embodiments, the blockchain system 820 burns the respective bids of first tier-tokens from active validator nodes, i.e., removes the bids of first-tier tokens from the current total quantity of first-tier tokens in the blockchain ledger 880.

Processing steps 702-716 may be repeated for each new period in the blockchain system 820.

Referring to FIG. 9, there is shown an computing device 1000 suitable for use with some implementations of the present technology, the computing device 1000 comprising various hardware components including one or more single or multi-core processors collectively represented by processor 1002, a graphics processing unit (GPU) 1004, a storage drive such as a solid-state drive 1006, a random-access memory 1008, a display interface 1010, and an input/output interface 1012.

In one or more embodiments, the computing device 1000 may be used to implement the producer computer node 106 and the plurality of computer nodes 822, 824, 826, 828.

Communication between the various components of the computing device 1000 may be enabled by one or more internal and/or external buses 1014 (e.g. a PCI bus, universal serial bus, IEEE 1394 "Firewire" bus, SCSI bus, Serial-ATA bus, etc.), to which the various hardware components are electronically coupled.

The input/output interface 1012 may be coupled to a touchscreen 1016 and/or to the one or more internal and/or external buses 1014. The touchscreen 1016 may be portion of the display. In one or more embodiment, the touchscreen 1016 is the display. The touchscreen 1016 may equally be referred to as a screen 1016. In the embodiments illustrated in FIG. 1, the touchscreen 1016 comprises touch hardware 1018 (e.g., pressure-sensitive cells embedded in a layer of a display allowing detection of a physical interaction between a user and the display) and a touch input/output controller 1020 allowing communication with the display interface 1010 and/or the one or more internal and/or external buses 1014. In one or more embodiment, the input/output interface 1012 may be connected to a keyboard (not shown), a mouse (not shown) or a trackpad (not shown) allowing the user to interact with the computing device 1000 in addition or in replacement of the touchscreen 1016.

According to implementations of the present technology, the solid-state drive 1006 stores program instructions suitable for being loaded into the random-access memory 1008 and executed by the processor 1002 and/or the GPU 1004 for asset-based consensus in accordance with the method embodiments presented herein. For example, the program instructions may be a portion of a library or an application.

The computing device 1000 may be implemented as a server, a desktop computer, a laptop computer, a tablet, a smartphone, a personal digital assistant or any device that may be suitable to implement the present technology, as it may be understood by a person skilled in the art.

In the proposed two-tier token system for use in the consensus process, the present two-tier blockchain protocol incentivizes producer nodes associated with asset producers to operate validator nodes to compete in the bidding and staking process for block rewards. Nodes that bid more first-tier tokens may obtain an advantage. This incentivizes real economic activities to obtain block rewards. For example, more asset production results in more first-tier tokens to make higher bids and to receive higher proportionate rewards per block. Additionally, more asset production can result in more first-tier tokens to run more validator nodes with a higher frequency to receive block rewards.

In the proposed two-tier token system, the consensus process and business profits are separate. The present two-tier blockchain protocol mints second-tier tokens that are decoupled from the underlying assets, and therefore not subject to regulations for asset-backed tokens. The asset producing entities may handle operating and investment activities independently of the blockchain protocol, and operate according to all applicable regulations. The two-tier blockchain protocol has no ownership nor claims to any assets or business activity of the asset producers.

According to embodiments of the proposed two-tier token system, real assets from assets producing entities are used to mint second-tier tokens while preventing malevolent entities from freely minting second-tier tokens.

In some embodiments, second-tier tokens are only awarded to nodes that participate in the proof-of-stake consensus process. The present technology is a secure proof-of-stake system, which makes a protocol attack economically unfeasible. All nodes require a base level of second-tier tokens to operate, and an attack against the protocol would require a large acquisition of second-tier tokens form the market. In addition, there is no way to be assured that bidding second-tier tokens will result in an ability to manipulate the consensus, because the selection of validator nodes based on second-tier bidders is random, and there are also first-tier nodes involved in the validation process.

Additionally, second-tier tokens are never directly awarded to asset producer nodes associated the asset producing entities. A producer node may only mint first-tier tokens to bid for a chance at increased block rewards; an asset producing entity must still operate validator node(s), thereby further securing the network before earning second-tier rewards.

In the proposed two-tier token system, the first-tier token acts as a shield to protect the second-tier token from any dishonest asset producer that attempts to freely mint second-tier tokens. Furthermore, embodiments are provided to limit the overall impact of fraudulent asset producers who manage to mint first-tier tokens on the present two-tier blockchain protocol. As stated above, in order to run a validator node, a producer node must accumulate sufficient second-tier tokens and optionally bid first-tier tokens or second-tier tokens to become an active validator. Because validators are selected randomly, there is no guarantee for a fraudulent producer node of being selected as an active validator.

The invention claimed is:

1. A method for transmitting second-tier tokens to a set of activate validator computer nodes in a blockchain system, the blockchain system comprising:

a plurality of validator computer nodes connected over a communication network, the blockchain system maintaining a two-tier blockchain ledger comprising:

a first-tier token, the first-tier token being a first type of token being associated with physical asset production, and a second-tier token, the second-tier token being a second type of token, a total quantity of the second-tier tokens depending on a total quantity of the first-tier tokens, the second-tier token being a protocol token of the two-tier blockchain ledger used to perform transactions, a new quantity of second-tier tokens being generated and awarded to the set of activate validator computer nodes validating transactions, the blockchain system being connected to a producer computer node, the method comprising:

receiving, from the producer computer node associated with an asset producing entity, asset production sensor data representative of a production of a given physical asset, the asset production sensor data having been measured by sensors of the asset producing entity;

generating a new quantity of first-tier tokens based at least on the asset production sensor data;

transmitting the generated new quantity of first-tier tokens to the producer computer node, a current total quantity of first-tier tokens being based on the generated new quantity of first-tier tokens and the total quantity of first-tier tokens;

generating the new quantity of second-tier tokens based on: the current total quantity of the first-tier tokens;

receiving, from a set of validator computer nodes from the plurality of validator computer nodes, at least one of: a respective bid quantity of first-tier tokens, and a respective staked quantity of second-tier tokens;

selecting, based on the at least one of the respective bid quantity of first-tier token and the respective staked quantity of second-tier tokens, the set of active validator computer nodes from the set of validator computer nodes;

validating, upon consensus by the set of active validator computer nodes, a pending block to obtain a new block in the two-tier blockchain ledger, the new block comprising at least an indication of the generated quantity of first-tier tokens and an indication of the total quantity of second-tier tokens; and transmitting, to each of the set of active validator computer nodes, a respective portion of the generated new quantity of second-tier tokens, a current total quantity of the second-tier tokens in the two-tier blockchain being based on the generated new quantity of the second-tier tokens.

2. The method of claim 1, wherein the selecting, based on the at least one of the respective bid quantity of first-tier tokens and the respective staked quantity of second-tier tokens, the set of active validator computer nodes from the set of validator computer nodes comprises:

selecting, based on the respective bid quantity of first tier-tokens, a subset of the set of validator nodes as super validator nodes, the super validator nodes being a subset of the set of active validator computer nodes; and determining the respective portion of the generated new quantity of second-tier tokens for the super validator nodes, the respective portion for the super validator nodes being greater than the respective portion of the generated quantity of second-tier tokens for a remainder of the set of active validator computer nodes.

3. The method of claim 2, further comprising:

burning the respective bid quantity of first-tier tokens, the burning causing a reduction of the current total quantity of first-tier tokens based on the respective bid quantity of first-tier tokens.

4. The method of claim 3, further comprising: transmitting the respective staked quantity of second-tier tokens back to the set of active validator computer nodes.

5. The method of claim 1, wherein the generating the new quantity of second-tier tokens comprises:

determining, upon consensus by the blockchain system, an asset production increase parameter; and determining the generated new quantity of second-tier tokens based on the asset production increase parameter and the total quantity of first-tier tokens.

6. The method of claim 1, wherein the generating the new quantity of first-tier tokens to the producer computer node comprises:

receiving asset production data having been generated based on the asset production sensor data;

receiving, from a trusted data source connected to the blockchain system, trusted production data;

comparing the asset production data and the trusted production data to obtain a comparison result; and determining the new quantity of first-tier tokens based on the comparison result.

7. The method of claim 1, further comprising, prior to validating, upon consensus by the set of active validator computer nodes, the pending block comprising at least the indication of the generated quantity of first-tier tokens to obtain the new block in the two-tier blockchain ledger:

generating, by a given node of the set of validator computer nodes, based on the asset production sensor data, the pending block for a current period.

8. The method of claim 7, further comprising: determining a respective portion of the new generated quantity of second-tier tokens for transmission to the given node.

9. The method of claim 1, wherein the total quantity of the first tier-tokens is a total quantity of first-tier tokens for a previous period.

10. The method of claim 1, further comprising:

receiving, from the producer computer node, a request for addition to the blockchain system as a new validator computer node; and adding, upon consensus by the validator computer nodes, the producer computer node to the blockchain system as a new validator computer node.

11. The method of claim 1, wherein the set of active validator computer nodes are an improper subset of the set of validator computer nodes.

12. The method of claim 1, wherein:

each validator computer node stores a respective wallet comprising: a respective set of cryptographic keys, a respective quantity of second-tier tokens and a respective quantity of first-tier tokens; and wherein the producer computer node stores a respective producer wallet comprising a respective set of producer cryptographic keys, the respective producer wallet for receiving the generated new quantity of first-tier tokens.

13. The method of claim 1, wherein the given physical asset comprises at least one of: precious metals, energy commodities, agricultural commodities, and industrial metals.

14. A system for transmitting a respective portion of a new quantity of second-tier tokens to a set of activate validator computer nodes in a two-tier blockchain ledger, the two-tier blockchain ledger comprising:

a first-tier token, the first-tier token being a first type of token being associated with physical asset production, and a second-tier token, the second-tier token being a second type of token, a total quantity of the second-tier tokens depending on a total quantity of the first-tier tokens the second-tier token being a protocol token of the two-tier blockchain ledger used to perform transactions, the new quantity of second-tier tokens being generated and awarded to the set of activate validator computer nodes validating transactions, the system comprising:

a plurality of validator computer nodes connected over a communication network, the system being configured for:

receiving, from a producer computer node connected to the system, the producer computer node being associated with an asset producing entity, asset production sensor data representative of a production of a given physical asset, the asset production sensor data having been measured by sensors of the asset producing entity;

generating a new quantity of first-tier tokens based at least on the asset production sensor data;

transmitting the generated new quantity of first-tier tokens to the producer computer node, a current total quantity of first-tier tokens being based on the generated new quantity of first-tier tokens and the total quantity of first-tier tokens;

generating the new quantity of second-tier tokens based on the current total quantity of the first-tier tokens;

receiving, from a set of validator computer nodes from the plurality of validator computer nodes, at least one of: a respective bid quantity of first-tier tokens, and a respective staked quantity of second-tier tokens;

selecting, based on the at least one of the respective bid quantity of first-tier token and the respective staked quantity of second-tier tokens, the set of active validator computer nodes from the set of validator computer nodes;

validating, upon consensus by the set of active validator computer nodes, a pending block to obtain a new block in the two-tier blockchain ledger, the new block comprising at least an indication of the generated quantity of first-tier tokens and an indication of the total quantity of second-tier tokens; and transmitting, to each of the set of active validator computer nodes, a respective portion of the generated new quantity of second-tier tokens, a current total quantity of the second-tier tokens in the two-tier blockchain being based on the generated new quantity of the second-tier tokens.

15. The system of claim 14, wherein the selecting, based on the at least one of the respective bid quantity of first-tier tokens and the respective staked quantity of second-tier tokens, the set of active validator computer nodes from the set of validator computer nodes comprises:

selecting, based on the respective bid quantity of first tier-tokens, a subset of the set of validator computer nodes as super validator nodes, the super validator nodes being a subset of the set of active validator computer nodes, and determining the respective portion of the generated new quantity of second-tier tokens for the super validator nodes, the respective portion for the super validator nodes being greater than the respective portion of the generated quantity of second-tier tokens for a remainder of the set of active validator computer nodes.

16. The system of claim 15, wherein the system is further configured for:

burning the respective bid quantity of first-tier tokens, the burning causing a reduction of the current total quantity of first-tier tokens based on the respective bid quantity of first-tier tokens.

17. The system of claim 16, wherein the system is further configured for: transmitting the respective staked quantity of second-tier tokens back to the set of active validator computer nodes.

18. The system of claim 14, wherein the generating the new quantity of second-tier tokens comprises:

determining, upon consensus by the system, an asset production increase parameter; and determining the generated new quantity of second-tier tokens based on the asset production increase parameter and the total quantity of first-tier tokens.

19. The system of claim 14, wherein the generating the new quantity of first-tier tokens comprises:

receiving asset production data having been generated based on the asset production sensor data;

receiving, from a trusted data source connected to the system, trusted production data;

comparing the asset production data and the trusted production data to obtain a comparison result; and determining the new quantity of first-tier tokens based on the comparison result.

20. The system of claim 14, wherein the system is further configured for, prior to validating, upon consensus by the set of active validator computer nodes, the pending block comprising at least the indication of the generated quantity of first-tier tokens to obtain the new block in the two-tier blockchain ledger:

generating, by a given node of the set of validator computer nodes, based on the asset production sensor data, the pending block for a current period.

21. The system of claim 20, wherein the system is further configured for: determining a respective portion of the new generated quantity of second-tier tokens for transmission to the given node.

22. The system of claim 14, wherein the total quantity of the first tier-tokens is a total quantity of first-tier tokens for a previous period.

23. The system of claim 14, wherein the system is further configured for:

receiving, from the producer computer node, a request for addition to the system as a new validator computer node; and adding, upon consensus by the validator computer nodes, the producer computer node to the system as a new validator computer node.

24. The system of claim 14, wherein the set of active validator computer nodes are an improper subset of the set of validator computer nodes.

25. The system of claim 14, wherein:

each validator computer node stores a respective wallet comprising: a respective set of cryptographic keys, a respective quantity of second-tier tokens and a respective quantity of first-tier tokens; and wherein the producer computer node stores a respective producer wallet comprising a respective set of producer cryptographic keys, the respective producer wallet for receiving the generated new quantity of first-tier tokens.

26. The system of claim 14, wherein the given physical asset comprises at least one of: precious metals, energy commodities, agricultural commodities, and industrial metals.

\* \* \* \* \*